United States Patent [19]  [11] Patent Number: 4,480,860
Foresta et al.  [45] Date of Patent: Nov. 6, 1984

[54] TRANSITION COUPLING AND CLAMP ASSEMBLY CONTAINING SAME

[75] Inventors: Anthony J. Foresta, Andover; James A. Tarara, Westford, both of Mass.

[73] Assignee: Clamp-All Corp., Billerica, Mass.

[21] Appl. No.: 527,417

[22] Filed: Aug. 29, 1983

[51] Int. Cl.³ .......................................... F16L 21/00
[52] U.S. Cl. ...................................... 285/177; 285/236
[58] Field of Search .............................. 285/177, 236

[56] References Cited

U.S. PATENT DOCUMENTS

| | | | |
|---|---|---|---|
| 703,657 | 7/1902 | Horn | 285/177 |
| 2,165,926 | 7/1939 | Greene | 285/177 X |
| 3,233,907 | 2/1966 | Stanton | 285/177 X |
| 3,298,698 | 1/1967 | Condon | 285/177 X |
| 3,378,282 | 4/1968 | Demler, Sr. | 285/177 X |
| 3,479,066 | 11/1969 | Gittleman | 285/236 |
| 3,887,221 | 6/1975 | Young | 285/236 |
| 4,172,607 | 10/1979 | Norton | 285/236 |
| 4,186,948 | 2/1980 | Cronk | 285/236 X |
| 4,221,407 | 9/1980 | Steimle | 285/236 |
| 4,380,348 | 4/1983 | Swartz | 285/236 |

FOREIGN PATENT DOCUMENTS

| | | | |
|---|---|---|---|
| 806526 | 12/1936 | France | 285/177 |
| 558906 | 2/1975 | Switzerland | 285/177 |
| 1455735 | 11/1976 | United Kingdom | 285/177 |

Primary Examiner—Thomas F. Callaghan
Attorney, Agent, or Firm—Richard P. Crowley

[57] ABSTRACT

A pipe clamp assembly for joining joint or pipe ends of different diameter in a clamping relationship, which clamp assembly comprises a flexible clamping band which surrounds the ends of the pipe or joint to be joined, a polymeric circumferential, thin sealing gasket beneath the clamping band and a polymeric circumferential transition coupling within the sealing gasket, the transition coupling having grooves on the exterior surface to engage sealing beads on the interior surface of the sealing gasket, to form a sealing relationship between the exterior surface of the transition coupling and the interior surface of the sealing gasket, and circumferential sealing beads on the interior surface of the transition coupling, to form a sealing relationship with the exterior surface of the reduced diameter joint or pipe to be sealed, thereby providing a clamp assembly adapted to clamp together pipes or joint ends of different diameters.

15 Claims, 4 Drawing Figures

TRANSITION COUPLING AND CLAMP ASSEMBLY CONTAINING SAME

BACKGROUND OF THE INVENTION

Pipe-clamping assemblies are typically employed for the installation and joining of rigid pipes and pipe joints, particularly cast-iron pipes employed for sewage, sanitary and domestic plumbing requirements. The pipe-clamping assembly clamps together the pipe ends or joint ends in a fluid-tight-sealing, aligned relationship. The pipe-clamping assembly may be used on cast-iron pipes, polyvinyl-chloride pipes or steel pipes of various sizes and dimensions. A variety of pipe-clamping assemblies has been proposed, and in particular pipe-clamping assemblies as disclosed in U.S. Pat. No. 4,101,151, issued July 18, 1978 to Harry J. S. Ferguson, have provided a simple, easily manufactured, effective clamping assembly which provides for slight variations in external pipe diameters, which patent is hereby incorporated by reference.

The pipe-clamping assembly of the Ferguson patent comprises a flexible, typically sheet-metal clamping band of a defined length which is adapted to surround circumferentially the ends of the pipe or joints to be joined, and having an underlying, compressible, circumferential sealing gasket adapted to be disposed between the pipe or joint ends and the overlapping clamping bands, so as to overlap and bridge the junctions between the pipe or joint ends. Typically, the sealing gasket is characterized optionally by an outwardly raised central section which fits snugly within a raised central section of the band clamp, to prevent movement of the sealing gasket in the clamping position. Also, the sealing gasket generally comprises at least a plurality of interior, raised, generally parallel sealing beads on each side of the pipe or joint junctions, so that the sealing beads may engage the exterior surface of the pipe or joints in a sealing relationship, when the clamping assembly is in a clamping position. Further, the sealing gasket comprises an inwardly extending flap or sealing bead generally centrally positioned, against which the abutting edges of the pipe or joints are placed, which further holds the sealing gasket in position and forms a sealing relationship with the abutting ends of the pipe or joints. The clamping assembly also includes a means for tightening the clamping band, so as to compress and place the underlying sealing gasket into a fluid-tight sealing relationship. Typically, the clamping means comprises a pair of flat threadably moveable band straps on either side of the exterior of the clamping band.

A further improvement in the pipe clamp assembly of the Ferguson patent is described in U.S. Pat. No. 4,380,348, issued Apr. 19, 1983, to Frederick Swartz, also hereby incorporated by reference, which patent employs a similar sealing gasket, but which also discloses that the clamping band has an upwardly and reversely extending section along the edge, which section extends toward the underlying pipe or joint, to prevent unwanted outward movement of the sealing gasket in the clamping position.

Where the pipe ends or joint ends of different outside diameters are to be joined in a clamping assembly, which commonly arises in the joining of pipes or joints of different outside diameters and of different materials, such as copper, PVC, steel, cast iron and the like, in the plumbing field, it has been the practice to employ a sealing gasket for the clamping band which is specifically and integrally molded in one piece, wherein one or the other side of the gasket is formed, having a different selected inside diameter at the one end from the inside diameter of the other end, while the outside diameter of the sealing gasket is substantially the same, so that it may be placed beneath the clamping band. Specially molded, integral, transition gaskets for use with clamping assemblies have been prepared for common-pipe transition couplings, such as $2 \times 1\frac{1}{2}$ inches or $4 \times 3$ inches; that is, a one-piece molded coupling has a diameter of the first number 2 or 4 inches at one end and $1\frac{1}{2}$ or 3 inches at the other end, thereby permitting the pipe or pipe joints of different sizes to be engaged within the clamping band. The internal surface of the relatively thin; that is, larger-diameter, end and the inside surface of the relatively large, that is, the smaller-diameter end have a pair of spaced-apart, raised beads which, like the sealing gasket, form a sealing relationship with the exterior surface of the different-diameter pipe or pipe joints to be joined. While such specially one-piece-molded transition gaskets are effective, they must be specially molded to fit the specific different pipe or joint ends and are, therefore, expensive. Furthermore, the plumber employing such molded gaskets has an inventory problem, since the gaskets are not interchangeable. Such one-piece-molded special gaskets are sold, for example, by Fernco, a joint-sealer company of Michigan, and Mission Clay Products Co. of California as replacement gaskets for the sealing gaskets, as set forth in the Ferguson and Swartz patents, supra.

Rubber pipe couplings for pressure pipe systems are also known, wherein a pipe has its external or outside diameter grooved and internal grooves in a rubber gasket which fit into the grooves on the outside of the pipe. Such pipe couplings are not for reduction purposes, but to provide for a high-pressure seal between the exterior surface of the pipe and an outside external housing, and typically are employed on pressurized water-sprinkler systems. Such high-pressure pipe couplings are known as Victaulic couplings and are sold by Victaulic Company of America of Easton, Pa.

It is desirable to provide an improved pipe-clamping assembly containing a removable and replaceable transition coupling therein and a transition coupling which is easy and simple to manufacture and to install, and which pipe-clamping system avoids the difficulties associated with one-piece, specially molded, expensive pipe gaskets.

SUMMARY OF THE INVENTION

The invention is directed to an improved pipe-clamping assembly containing a pipe transition coupling, and to the reduction or pipe transition coupling so used, and to a method of using such improved pipe-clamping assembly.

The invention comprises an improved clamp assembly for joining pipe joints or pipe ends, particularly those that have a different diameter, in a clamping relationship. The clamping assembly may be employed using the prior-art Ferguson and Swartz clamping assembly in one embodiment, while the pipe transition coupling described herein may also be employed with other clamping assemblies of the prior art which employ a sealing gasket beneath a circumferential clamp and wherein the sealing gasket contains or is modified to contain an internal structure to permit a sealing relationship between the exterior surface of the pipe transition coupling and the interior surface of the sealing gasket.

The clamping assembly of the invention comprises a flexible clamping band of defined circumference which is adapted to surround circumferally the ends of the pipes or the joints which are to be joined together and generally to be positioned across and around the abutting pipe or joint ends. The clamping assembly also includes a polymeric, typically elastomeric-type circumferential thin sealing gasket disposed beneath the clamping band. The thin sealing gasket has an interior surface and an exterior surface and a diameter such as to fit over the exterior surfaces of the two pipe ends or pipe joints to be joined where the pipe joints and ends are generally of the same exterior diameter. The thin sealing gasket generally is positioned to overlap centrally the junction between the joint or pipe ends. When the joint or pipe ends are placed in an abutting relationship, the internal surface of the sealing gasket should generally comprise some means to provide exterior seals against the exterior surface of the pipe ends or joints and usually comprises one or two or more pairs of circumferentially spaced-apart generally parallel raised sealing beads thereon. Where the sealing gasket employs two pairs of sealing beads, then usually one pair of each sealing bead is placed on one side and one on the other side of the junction or the abutting ends of the joint or pipe ends to be sealed. The sealing beads are adapted to provide a peripheral sealing relationship against the exterior surface of the pipe or joints to be clamped together by the overriding metal clamping band.

The clamping assembly also includes means to permit the tightening of the metal clamping bands which is generally placed in an overlapping sliding relationship about the sealing gasket, such means to tighten the clamping band often comprises one or two pairs of flat metal clamping bands disposed generally one pair on each side at least of the junction of the joint or pipe ends and adapted to be threadably tightened so that the overlapping tightened clamping band generally retains the underlying sealing gasket in position. If desired, the clamping band may contain a plurality of generally uniformly spaced edge slits therearound as in the Ferguson patent to permit a close fitting where pipe diameters tend to vary, such as in clay or soil pipes. In addition, the metal clamping band may contain extending peripheral edges extending downward toward the exterior surface of the pipes to be clamped as in the Swartz patent to prevent further movement of the underlying sealing gasket. The metal clamping band may, if desired, contain, as in the Swartz and Ferguson patents, a raised central area with the underlying sealing gasket also comprising a raised central area; however, this is not essential and other types of clamping bands which are generally flat, corrugated or of other nature, may be employed.

The improved clamping assembly of the invention includes a polymeric, typically an elastomeric circumferential pipe transition coupling therein, which provides for a transition between pipe or joint ends of different diameters. The transition couplng is employed generally on one or the other side of the clamping assembly and within the sealing gasket; however, if desired, pipe transition couplings of the invention may be employed on each side. The pipe transition coupling is tubular and has an internal diameter surface and an external diameter surface. The external diameter should be substantially the same as the internal diameter of the sealing gasket in the clamp assembly with which the transition coupling is to be employed. The internal diameter of the pipe transition coupling is of less diameter than the internal diameter of the sealing gasket and is selected based on the reduced diameter of the pipe or joint end to be sealed against the internal diameter surface of the pipe transition coupling. The longitudinal length of the pipe transition coupling is less than the longitudinal length of the sealing gasket and generally one half less than the sealing gasket where it fits only on one side of the clamp assembly.

The transition coupling is so structured and formed to have an external diameter surface which permits the external diameter surface of the transition coupling to fit into or about the internal surface of the sealing gasket to form a sealing relationship between the internal surface of the sealing gasket and the external surface of the transition pipe coupling so that the transition coupling when placed on one or the other end of the sealing gasket may be snapped or fitted into place in an easy and generally removable manner. The pipe transition coupling in use with a standard sealing gasket of the Ferguson and Swartz patents generally have at least one pair of grooves on the external diameter surface which are adapted and so positioned to engage in a snap-in removable sealing relationship with the raised sealing beads on the internal diameter surface of the sealing gasket to form a sealing relationship between the surfaces. Thus, where the sealing gasket comprise one or two pairs of sealing beads on each side of the pipe end or pipe junction, then the corresponding external surface of the transition coupling would have corresponding hemispherical grooves into which the raised sealing beads generally hemispherical in nature would snap-fit or lock so that the transition coupling surface would be easily placed and locked in position. The internal surface of the transition coupling may be smooth, but preferably has some means to form a sealing relationship with the external surface of the reduced diameter pipe end or joint to be sealed and generally comprises at least one pair and sometimes two pairs of generally hemispherical-type or raised sealing beads usually, but not necessarily, of the same type as in the sealing gasket so that on tightening of the metal clamping bands of the clamping band a sealing relationship is easily established against the external surface of the reduced pipe or joint. Thus, with present prior art sealing gaskets in use, the means to engage the external surface of the transition coupling comprises matching a pair of spaced apart circumferential generally parallel inwardly-directed grooves on the external surface which are adapted to and are engaged matingly in a snap-in sealing relationship with the raised generally parallel beads on the internal diameter surface of the sealing gasket.

The pipe transition coupling is generally composed of a polymeric resilient type material, particularly an elastomeric material generally of the same type of material, such as, the neoprene, as the sealing gasket in order to avoid any differences in material properties and should be sufficiently resilient so that the material may be forced into position by the plumber or user. The transition coupling then comprises means on the external surface thereof to form a sealing relationship with the internal surface of the sealing gasket or even the metal clamping band, while the internal diameter surface may be smooth or preferably contain means to form a sealing relationship with the exterior relationship of the reduced pipe or joint. The thickness of the transition coupling of course depends upon the amount of pipe reduction required with a particular pipe selected. The sealing gasket of the prior art typically employ a centrally disposed annular lip element which extends such as to form a slight elastomeric abutment between the two ends of the pipes or joints to be joined so as to help in the sealing relationship. The sealing gasket may continue to contain such centrally positioned lip and the transition coupling in place generally has one annular edge thereof placed against this lip; however, the use of a lip extending from the transition coupling is not required since, usually with substantial reduction, there is no abutting edge of the opposite pipe or joint end for the lip to fit against.

The improved pipe clamp assembly and the pipe transition coupling of the invention provides important and significant advantages over clamping assemblies and transition couplings employed in the prior art in that the pipe transition couplings may be performed in one integrally-molded piece and then employed within the standard sealing gasket, thus, the transition pipe couplings need not be specially molded to fit the one and the other ends, but only directed to the one end of the reduced pipe end or joint, and may be employed with the usual sealing gasket or other gaskets in which the transition pipe couplings can be inserted.

The transition coupling may be made to standard reduction thicknesses and diameters, and, if desired, a transition coupling may be snap-fitted and placed within the interior of another transition coupling where one pipe or joint is to be further reduced or where the particular one transition coupling is not available.

The invention will be described for the purposes of illustration only in connection with a preferred embodiment; however, it is recognized that those persons skilled in the art may make various changes, modifications and additions to the embodiment as illustrated, without departing from the spirit and scope of the invention.

DESCRIPTION OF THE EMBODIMENTS

Figure 1:
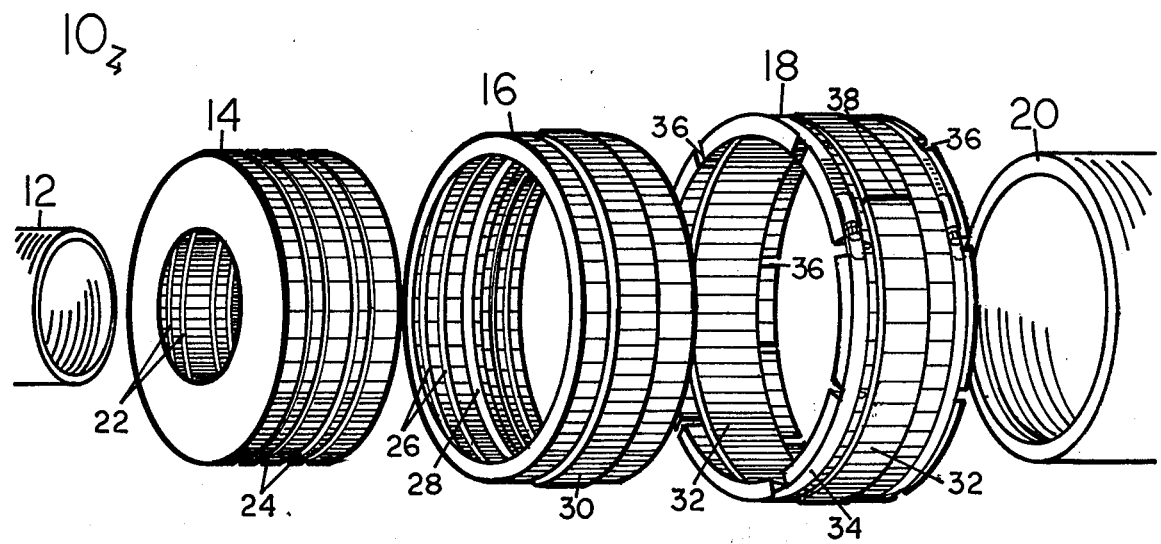
FIG. 1 is an exploded, perspective, illustrative view of an improved pipe-clamp assembly of the invention employing a transition coupling.

FIG. 1 shows the pipe-clamp assembly of the invention 10 with a pipe 12 of reduced diameter and a pipe 20 of larger diameter each at one end of an improved pipe clamp assembly 10 which comprises a transition pipe coupling 14, a thin sealing gasket 16 and an overlapping metal clamping band 18 having an end 38. The transition pipe coupling 14 contains a pair of sealing gasket ridges 22 on the inner diameter surface thereof and a pair of generally parallel circumferential grooves 24 on the outer diameter surface thereof. The thin sealing gasket 16 has two pairs of sealing gasket ridges 26 extending circumferentially around the internal surface with a pair of ridges extending on each side of an extending centrally disposed lip 28. The sealing gasket 16 includes generally disposed centrally raised ridge 30 about the external surface which fits within the central raised portion 32 of the metal clamping band. The metal clamping band has band straps 34 on either side adapted to be threadably tightened in use and includes a plurality of generally longitudinally uniformly spaced slits 36 on either side of the raised area 32 so that on tightening of the clamping band 18, the band is slideably adjusted to compress the underlying sealing gasket 16 and the transition pipe coupling 14.

Figure 2:
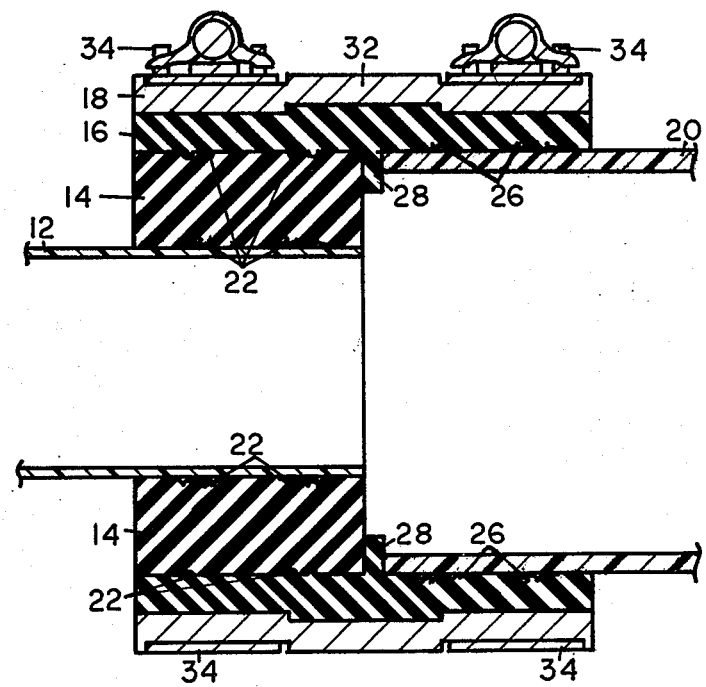
FIG. 2 is an enlarged sectional view of the improved pipe clamp assembly of FIG. 1 in a clamping sealed position.

FIG. 2 is a fragmentary enlarged sectional view of the improved pipe-clamp assembly in use wherein the small diameter pipe 12 is held in a tight sealing relationship within the one end of the coupling 14 which occupies about one half of the pipe-clamp assembly 10 with one edge of the transition coupling 14 extending against inner central lip 28 and wherein the internal diameter surface of the transition coupling contains raised sealing beads 22 which forms a sealing relationship with the external surface of the reduced pipe 12. The external grooves 24 on the external surface of the transition pipe coupling 14 are shown as snap-fitted onto the raised sealing beads 26 on the internal surface of the sealing gasket 16 so as to form a mating relationship between the internal diameter surface of the sealing gasket 16 and the external surface of the transition coupling 24 wherein the threadable flat clamps 34 have been tightened in position such that the pipes 20 and 12 are in a sealed, clamped relationship. The sealing beads 26 on the opposite side of the sealing gasket 16 form a sealing relationship as designed with the external surface of the large diameter pipe 20 with the end of the pipe abutting against the central lip 28. As illustrated, the transition coupling 14 and sealing gasket 16 are formed of an elastomer, such as, neoprene, and the transition coupling is sufficiently resilient to be forced fitted within one half of the sealing gasket 16. The internal surface diameter of the transition coupling 14 is selected to fit the desired diameter of the reduced pipe 12 to be used, while the external diameter of the transition pipe coupling 14 is designed to be the same as or just slightly less than the internal diameter of the sealing gasket 18 with which it is to be used. Where two transition pipe couplings are employed, one on each side, then a sealing gasket of defined diameter may be altered so that one transition gasket can fit on each side so that pipes of different diameter than that from which the sealing gasket was designed may be accommodated on each side.

Figure 3:
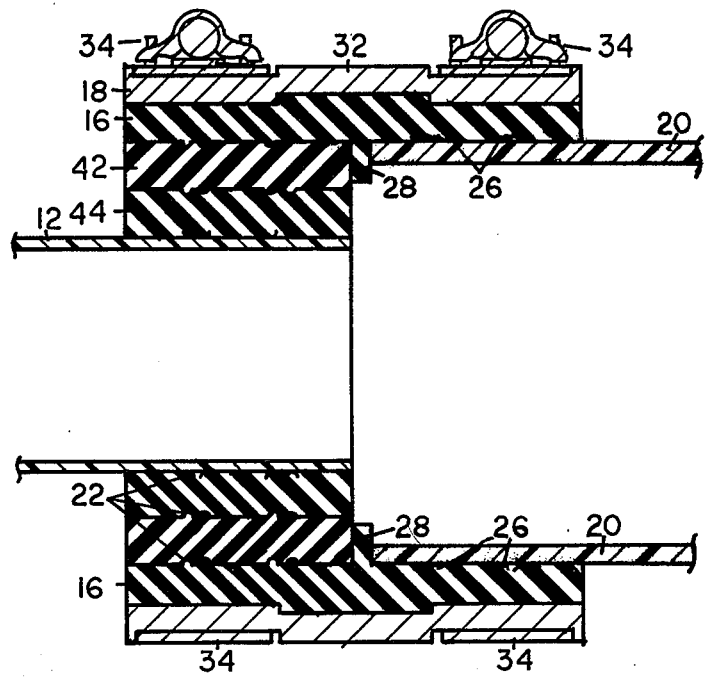
FIG. 3 is an enlarged sectional view of a pipe clamp assembly of the invention with one transition coupling engaged in a sealing relationship within another transition coupling.

FIG. 3 is a sectional view of an improved pipe clamp assembly of FIG. 2 wherein the transition coupling 14 is formed by one transition coupling 44 being snap-fitted together by grooves and raised beads and placed within the interior of another transition coupling 42 such as where the particular transition coupling 14 is not available or in inventory.

Figure 4:
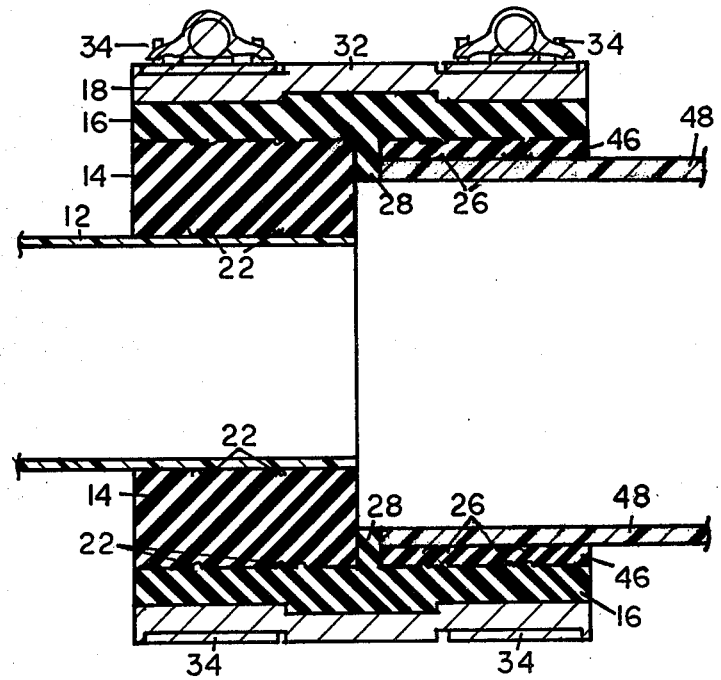
FIG. 4 is an enlarged sectional view of a pipe clamp assembly of the invention wherein a transition coupling is placed within the sealing gasket on either side of the pipe or joint junction.

FIG. 4 is a sectional view of an improved pipe clamp assembly wherein another pipe transition coupling 46 is placed in a snap-fitted sealing relationship together by grooves and raised beads on the other side of the thin sealing gasket 16 of FIG. 2, so that there are transition couplings 14 and 46 on either side of the clamp assembly and so that pipes or joints of different diameter 12 and 48 from that for which the thin sealing gasket 14 was designed can be accommodated on each side of the clamp assembly.

What we claim is:

1. A clamp assembly for joining joint or pipe ends in a clamping relationship, which clamp assembly comprises:
   (a) a clamping band to surround the ends of pipes or joints to be joined together;
   (b) a polymeric, circumferential, thin sealing gasket having an interior surface and internal diameter and an exterior surface and exterior diameter, and disposed about the joint or pipe ends and beneath the clamping band to overlap the junctions between the joint or pipe ends, the internal surface of the gasket having circumferential raised sealing beads means thereon on the one side and on the other side of said junction, the sealing beads means to provide a sealing relationship against the exterior surface of the pipe or joint to be clamped together;
   (c) means to tighten the clamping band and to compress the sealing gasket beneath the clamping band; and
   (d) a first polymeric, circumferential transition coupling sealingly engaged within the sealing gasket on one side of said junction and having an external surface and external diameter and having an internal surface and a defined internal diameter, the external diameter substantially the same as the internal diameter of the sealing gasket, the transition coupling having circumferential raised sealing beads means on the internal surface thereof, to provide a sealing relationship with the exterior surface of the reduced diameter surface of a pipe or joint which is to be sealed by the transition coupling or with the external surface of another smaller size transition coupling, the transition coupling on the external surface characterized by circumferential inward groove means to engage in a removable sealing relationship with the raised sealing beads means of the gasket to provide for a clamp assembly whereby a pipe or joint of the same or different external diameter may be sealed together by the selection of the transition coupling or couplings within the clamp assembly.

2. The clamp assembly of claim 1 wherein the groove means on the transition coupling comprises at least one pair of spaced-apart, generally parallel annular grooves and the raised sealing means on the sealing gasket comprises at least one pair of spaced-apart, generally parallel annular raised beads positioned and formed to fit in a snap-in relationship with said pair of annular grooves.

3. The clamp assembly of claim 1 wherein the raised sealing means on the interior surface of the transition coupling comprises at least one pair of spaced-apart, generally parallel annular raised beads to seal against the exterior surface of a pipe or joint to be sealed or to fit sealingly within matching groove means of a second transition coupling inserted within the first transition coupling.

4. The clamp assembly of claim 1 wherein the sealing gasket includes a central annular short inwardly extending lip and wherein the first transition coupling is positioned adjacent the lip.

5. The clamp assembly of claim 1 wherein the sealing gasket includes an annular central raised element on the exterior surface and the clamping band is characterized by an annular central raised section to receive and retain the raised element of the sealing gasket.

6. The clamp assembly of claim 1 which includes a second transition coupling within the first transition coupling, the second transition coupling having an external diameter about the same as the internal diameter of the first transition coupling and an external surface characterized by circumferential inward groove means to engage in a removable fitting sealing relationship with the raised sealing beads means of the first transition coupling, and having a defined internal diameter and an internal surface having circumferential raised sealing beads means to provide a sealing relationship with the exterior surface of a pipe or joint to be sealed or with the groove means of a third transition coupling inserted within the second transition coupling.

7. The clamp assembly of claim 1 which includes a second transition coupling within the sealing gasket on the other side of said junction, the second transition coupling having an external diameter about the same as the external diameter of the sealing gasket and an external surface characterized by circumferential inward groove means to engage in a removable sealing relationship with the raised sealing beads means of the sealing gasket on the other side and having a defined internal diameter and an internal surface having circumferential raised sealing beads means to provide a sealing relationship with the exterior surface of a pipe or joint to be sealed or with the external surface of a third transition coupling inserted within the second transition coupling.

8. The clamp assembly of claim 1 wherein the transition coupling comprises about one half the axial length of the sealing gasket in which the transition coupling is sealingly engaged.

9. The clamp assembly of claim 1 wherein the transition coupling and the sealing gasket are composed of the same polymeric material.

10. The clamp assembly of claim 1 wherein the transition coupling of the sealing gasket comprises a resilient elastomeric polymeric material.

11. The clamp assembly of claim 1 which includes a plurality of transition couplings on one or the other or both sides of said junction, each transition coupling successively sealingly engaged within another transition coupling to provide a clamp assembly with a composite transition coupling having the desired internal diameter to be sealingly engaged with the external surface of a reduced diameter pipe or joint.

12. The clamp assembly of claim 1 which includes a plurality of transition couplings on the one side, each transition coupling successively sealingly engaged by raised bead and inward groove means within another transition coupling to provide on the one side a composite transition coupling with raised bead means on the internal surface in a sealing relationship with the exterior surface of a reduced diameter pipe or joint sealed in the clamp assembly.

13. A pipe or joint system which includes:
   (a) the clamp assembly of claim 1;
   (b) a first pipe or joint of reduced diameter sealingly engaged within a transition coupling on the one side; and
   (c) a second pipe or joint of a greater diameter sealingly engaged within the sealing gasket on the other side.

14. A pipe or joint system which includes:
   (a) the clamp assembly of claim 7;

(b) a first pipe or joint sealingly engaged within a transition coupling on the one side; and (c) a second pipe or joint sealingly engaged in a transition coupling on the other side.

15. A clamp assembly for joining joint or pipe ends in a clamping relationship, which assembly comprises:

(a) a clamping band which surrounds circumferentially the ends of pipes or joints to be joined together;

(b) a polymeric, circumferential, thin sealing gasket having an interior surface and internal diameter and an exterior surface and exterior diameter and beneath the clamping band to overlap the junction between the joint or pipe ends, the internal surface of the gasket having at least two pairs of circumferential, spaced-apart, generally parallel raised sealing beads thereon, one pair of each sealing beads on the one side and the other pair on the other side of said junction, the sealing beads to provide a peripheral sealing relationship with the exterior surface of the pipe or joint to be clamped together or with the external surface of another transition coupling;

(c) means to tighten the clamping band and to compress the sealing gasket beneath the clamping band; and (d) a polymeric, circumferential transition coupling within the sealing gasket and on one or the other side or both sides of said junction and having an external surface and external diameter and having an internal surface and a defined internal diameter, the external diameter substantially the same as the internal diameter of the sealing gasket, the transition coupling having at least one pair of annular, spaced-apart, generally parallel raised sealing beads on the internal surface thereof, to provide a peripheral sealing relationship with the exterior surface of the reduced diameter of the pipe or joint which is to be surrounded by the transition coupling or with another transition coupling, the transition coupling characterized on the external surface by at least one pair of annular, inward, spaced-apart, generally parallel grooves engaged in a removable, snap-in sealing relationship with the raised sealing beads of the sealing gasket to provide a clamp assembly to clamp together pipes or joint ends of different diameters.

* * * * *